United States Patent [19]

Ise et al.

[11] Patent Number: 5,266,943
[45] Date of Patent: * Nov. 30, 1993

[54] DATA TRANSMISSION SYSTEM

[75] Inventors: Masahiro Ise, Kashihara; Hidehiko Tanaka, Tenri; Katsuyuki Machimno, Nara; Toshiyuki Matsubara; Teiji Terasaka, both of Tenri, all of Japan

[73] Assignee: Sharp Kabushiki Kaisha, Osaka, Japan

[*] Notice: The portion of the term of this patent subsequent to Dec. 19, 2006 has been disclaimed.

[21] Appl. No.: 400,878

[22] Filed: Aug. 30, 1989

Related U.S. Application Data

[63] Continuation of Ser. No. 498,052, May 25, 1983, Pat. No. 4,888,586.

[30] Foreign Application Priority Data

May 25, 1982 [JP] Japan .................................. 57-89251

[51] Int. Cl.[5] .............................................. H04Q 1/00
[52] U.S. Cl. ........................... 340/825.05; 340/825.16; 371/62; 361/59; 361/94
[58] Field of Search ............... 340/825.05, 825.06, 340/825.16, 825.5; 371/62; 361/59, 74, 75, 89, 94

[56] References Cited

U.S. PATENT DOCUMENTS 4,498,082  2/1985  Aldridge et al. ............... 340/825.16
4,561,091  2/1985  Scholl et al. ..................... 340/825.5
4,888,586 12/1989  Ise et al. .......................... 340/825.05

Primary Examiner—Donald J. Yusko
Assistant Examiner—Dervis Magistre
Attorney, Agent, or Firm—Birch, Stewart, Kolasch & Birch

[57] ABSTRACT

A very useful data transmission system having a plurality of transmission modules connected to a single cable in a multidrop manner is disclosed herein. The system features its ability to check the transmission state at the level of individual modules through use of a proper code notation (typically, Manchester code). The system detects a specific module with proper signals lasting at the same level for more than a given time, except cable outputs, and treats it as involving a faulty condition and compels the transmission state to a halt, thus preventing only the faulty module or modules from transmitting signals thereby avoiding breakdown of the whole system.

14 Claims, 4 Drawing Sheets

DATA TRANSMISSION SYSTEM

This application is a continuation of copending application Ser. No. 498,052, filed on May 25, 1983 now U.S. Pat. No. 4,888,586.

BACKGROUND OF THE INVENTION

This invention relates a data transmission system wherein a plurality of transmission modules are connected in a multidrop manner.

It is well known that signal transmission may be effected utilizing building or house wiring or cable for power distribution. A typical example of a multidrop connection scheme is illustrated in FIG. 1, which includes a power distribution cable 1 and a plurality of transmission modules 2 for the transmission and receipt of data. The most serious problem of this kind of system is that in the event that any one of the transmission modules 2 is faulty in a hardware aspect while signals representative of transmission data continued to be supplied to the cable 1, the system becomes disabled as a whole and fails to send signals. In the case that a large number of the modules are installed, it is very difficult to determine which module is working improperly.

SUMMARY OF THE INVENTION

It is an object of the present invention to provide a data transmission system featuring the ability to check the transmission state at the level of individual modules through proper selection of code notation of signals. If the system detects a faulty module or modules it will inhibit only those faulty modules from sending signals thereby avoiding the breakdown of the system as a whole.

In a broad aspect of the present invention, there is provided a data transmission system including a plurality of transmission modules connected to a single cable in a multidrop manner, each of said transmission modules comprising means for generating codes which do not last at the same level for more than a given time even when the same data are transmitted continuously, means for monitoring the time where said codes remain at the same level, and means for considering the subject module as faulty and compelling the transmission state to a halt if the time the level remains constant exceeds a predetermined time.

The present invention therefore provides a very useful data transmission system having the plurality of transmission modules connected to a single cable in a multidrop manner, which system treats a specific module that has signals lasting at the same level for more than a given time except cable outputs, as involving a faulty condition and compels its transmission state to a halt, thus preventing only such a faulty module or modules from transmitting signals and avoiding breakdown of the whole system.

These and other aspects and advantages of the present invention will be more completely described below with reference to the accompanying drawings.

DETAILED DESCRIPTION OF THE INVENTION

Figure 1:
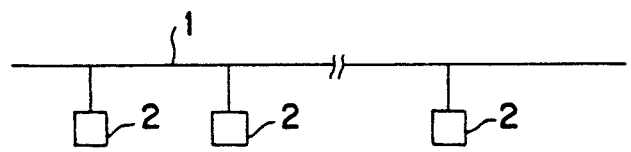
FIG. 1 is a schematic view of a multidrop connection transmission system.
Figure 2:
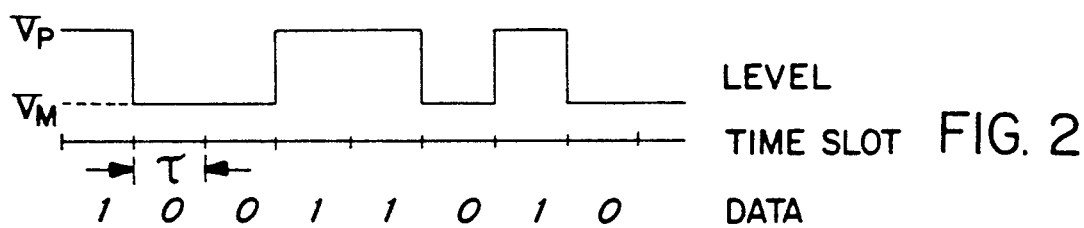
FIG. 2 is a time chart for explaining an example of an NRZ (Non Return to Zero) code notation.

Referring to FIGS. 2 to 11, there are illustrated a few embodiments of the present invention. The simplest data format is a so-called NRZ (Non Return to Zero) in which the signal level corresponds to the data on a one-to-one basis. When data are transmitted in the NRZ notation, a voltage corresponding to a piece of data is applied to a signal line over a predetermined time $\tau$ as seen in FIG. 2. In the example of FIG. 2, a data "1" is defined by a voltage $V_P$ and a data "0" by a voltage $V_M$. Nevertheless, in the case that the same data is transmitted continuously in the NRZ notation, the level remains constant and unchanged. This fact results in great difficulties in seeing if correct data are transmitted or if any hardware trouble arises in the system. The above problem may be overcome, provided that data are not represented by voltage levels on a one-to-one basis but by changes in the voltage levels.

Figure 3:
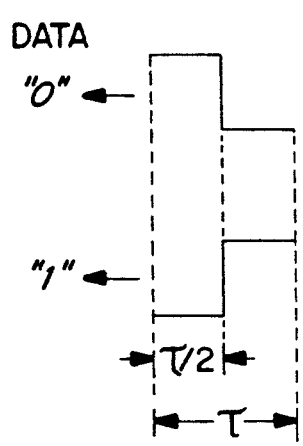
FIG. 3 is a time chart showing a signal waveform of Manchester codes.
Figure 4:
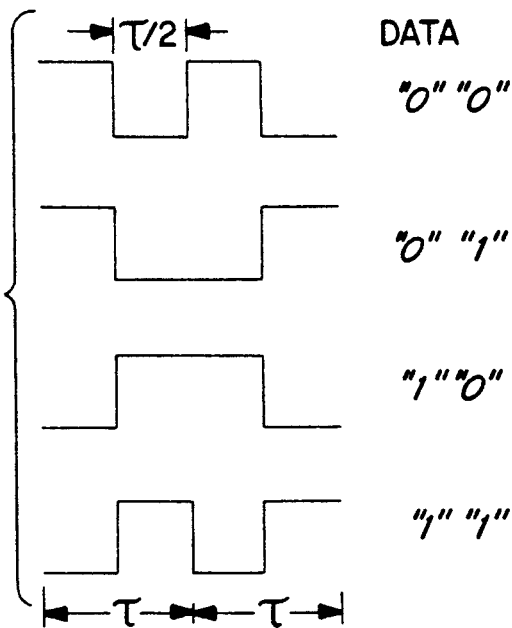
FIG. 4 is a time chart showing a typical signal waveform of respective combinations of Manchester codes.
Figure 5:
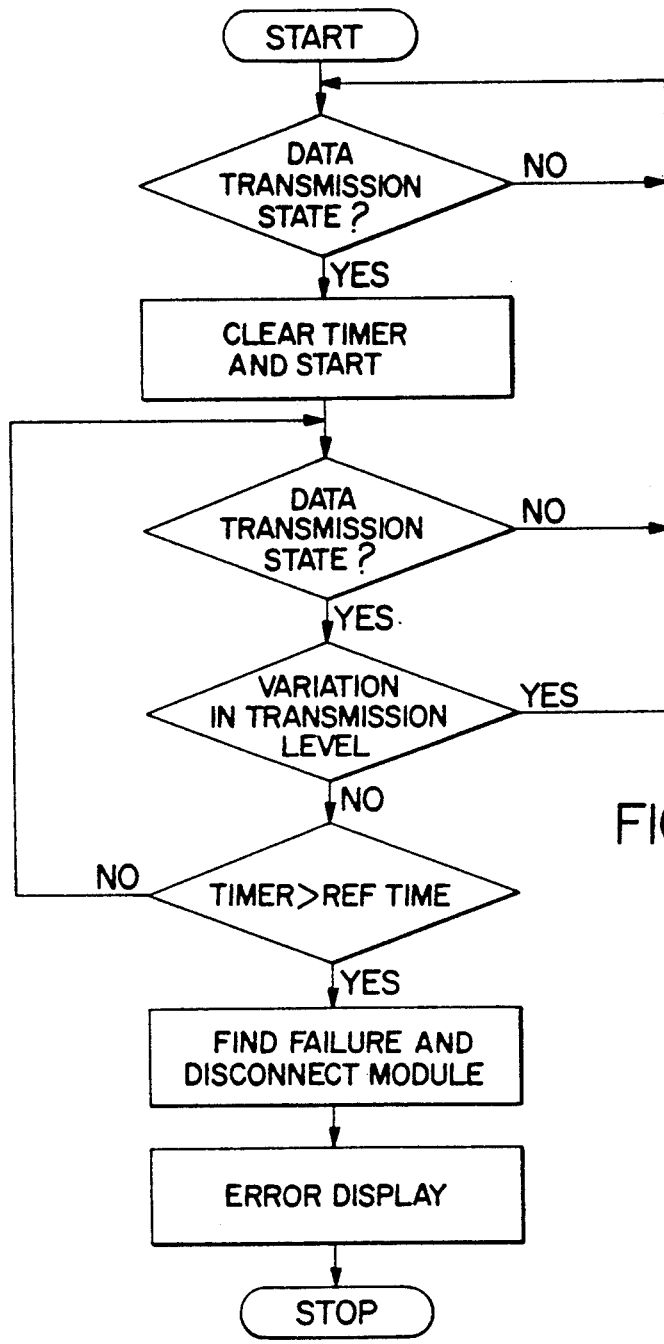
FIG. 5 is a flow chart describing trouble-shooting in an embodiment of the present invention.
Figure 6:
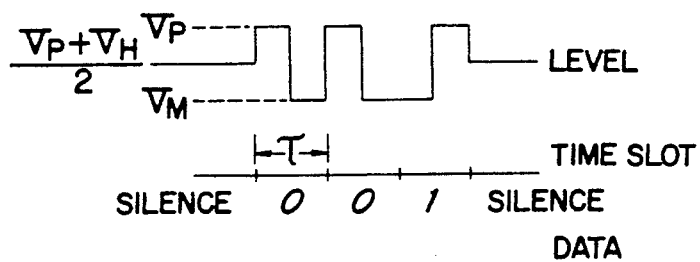
FIG. 6 is a time chart showing a typical level variation during signal transmission according to the embodiment of the present invention.

The above precondition is satisfied by Manchester codes as depicted in FIG. 3, for example. According to the Manchester code notation, each bit time $\tau$ is divided into two half slots and a data "0" is defined by a combination of levels "1" and "0" in time sequence and a data "1" by a combination of levels "0" and "1" in time sequence (or vice versa). In no event there is any signal lasting at the same level for more than $\tau$ seconds for possible four combinations of data, as would be understood from FIG. 4. If any signal lasts at the same level for more than $\tau$ seconds in the above code system, it may be considered that a hardware problem has happened somewhere in the system as long as such erroneous signal is distinguished from a silence.

The code notation as defined above is adopted in transmission modules pursuant to the teachings of the present invention. Trouble-shooting procedures are described in a flow chart of FIG. 5. A reference time is selected to be longer than $\tau$ and preferably selected to be more than $2\tau$. If there is no variation in the level of the signal being transmitted for more than such reference time, then the remedy taken thereafter is to treat the subject transmission module as having a hardware problem, disconnect its level supplying section and indicate that the subject module is out of condition.

One way to determine whether the module is in the transmission state and to disconnect the level supplying section is discussed below. To make detection of a silence easy, levels other than $V_P$ and $V_M$ are used during a silence interval (typically, $\frac{V_P + V_M}{2}$).

Figure 7:
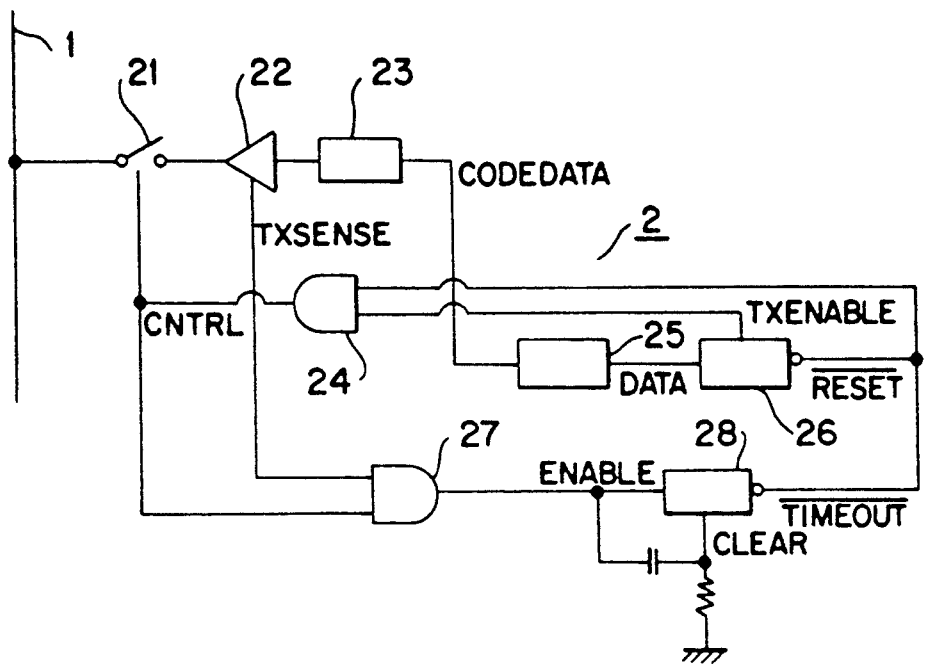
FIG. 7 is a block diagram of the embodiment of the present invention.

A typical example for implementing detection of abnormal transmission and forced disconnection is illustrated in FIG. 7.

In FIG. 7, there are shown a cable 1 for module-to-module signal transmission (also for power distribution), a disconnecting switch 21 for disconnecting the faulty transmission module or modules from the transmission cable during a silence interval or forced interuption of transmission and an AND gate 24 for controlling the switch 21. A transmission output section is denoted by 22 and whether the output section 22 is in the transmission state is determined by a signal TXSENSE. A transmission level setting section 23 outputs levels corresponding to outputs from the preceding code converter 25. The code converter 25 is adapted to convert NRZ data into a suitable code notation (the Manchester code or the like as described above). A data generation and control section 26 on one hand feeds the NRZ data to the code converter 25 and on the other hand feeds a transmission/disconnection signal TXENABLE to the AND gate 24. Another AND gate 27 is to permit monitoring of the transmission level by the signal TXSENSE only while the switch 21 is ON. A timer 28 is adapted for measuring the time that the signal remains at the same level. It is cleared with every variation in the level and keeps timer operation while the transmission level remains unchanged.

When the reference time is reached by the timer, its output TIMEOUT becomes true so that the output of the AND gate 24 is false and the switch 21 is OFF to bring transmission by the module to a stop. Since the data generation and control section 26 is usually implemented with a microcomputer or complicated hardware logic connection, this section more often causes a hardware trouble than the other sections in FIG. 7. In particular, when this is implemented with the microcomputer, it demands a special means to recover after a program sequence therein falls into disorder and the section gets out of control. To this end the signal $\overline{\text{TIMEOUT}}$ is applied as a $\overline{\text{RESET}}$ signal to the data generation and control section 26, with concurrent inhibition of level supply. Should the data control section return to its normal state with the signal $\overline{\text{RESET}}$, the system is ready to re-start transmission. Unless the data control section recovers its normal state, the subject module is disabled and the system cannot to transmit data to and from that module. However, in no event is the system broken down as a whole.

A simple and reliable way to generate the signal TXSENSE is to derive a power source current from the final stage. For this reason the transmission output section 22 of FIG. 7 is of an emitter follower configuration as shown in FIG. 8 (when $V_P > 0$, $V_M = 0$).

Figure 8:
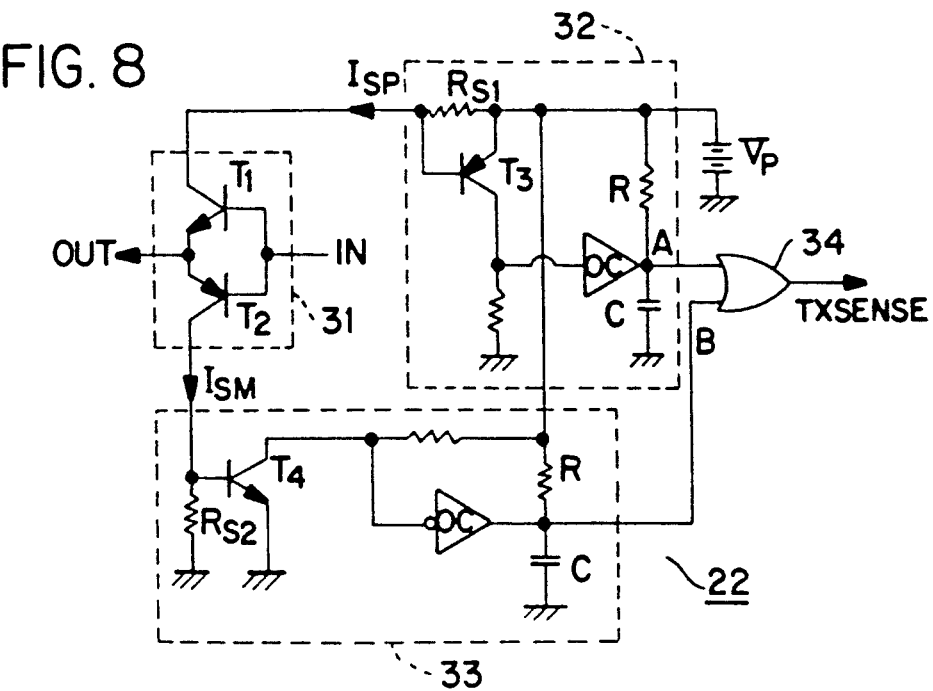
FIG. 8 is a detailed circuit diagram of a major portion of FIG. 7.

In FIG. 8, the transmission output section 22 includes an output stage emitter follower 31, a detector circuit 32 for deciding by current detection if a transistor $T_1$ is ON when IN=$V_P$, and a detector circuit 33 decides by current detection if a transistor $T_2$ is ON when IN=0. The signal TXSENSE is derived from an OR gate 34 responsive to the outputs of the two detector circuits 32 and 33. The detection levels may be optionally selected through the use of $R_{S1}$ and $R_{S2}$ with the resistances determined by the following definition.

$$I_{SP} \geq R_{S1} \cdot Vbe_P, \quad I_{SM} \geq R_{S2} Vbe_M \tag{1}$$

Figure 9:
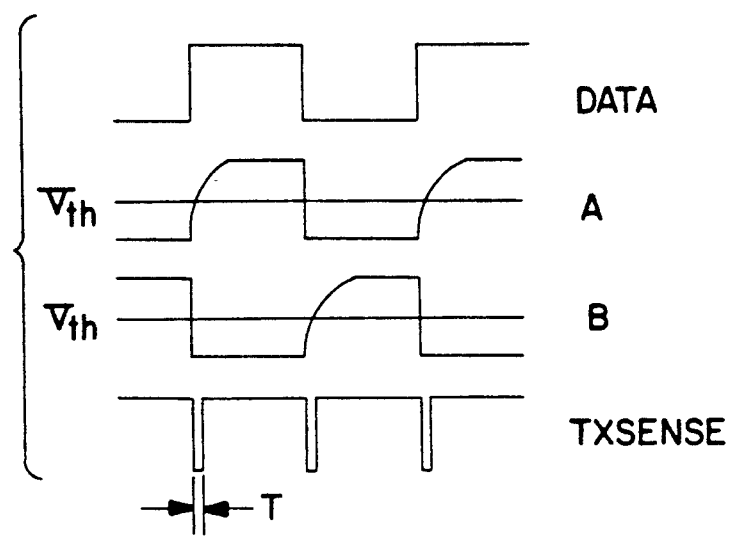
FIG. 9 is a time chart showing signal waveforms in the major portion as shown in FIG. 8.

$Vbe_P$ = base-emitter voltage of $T_3 \sim 0.7$ V
$Vbe_M$ = base-emitter voltage of $T_4 \sim 0.7$ V Various signals occurring in the circuit of FIG. 8 in operation are depicted in FIG. 9. The output of the circuit 32 is A and the output of the circuit 33 is B. The charging of a capacitor C via a resistor R starts when a transistor $Tr_3$ or $Tr_4$ in the detector circuits is turned ON and the output appears with a time delay T determined as a function of the CR time constant and the threshold voltage Vth of the OR gate 34 as follows:

$$T = -CR \ln\left(1 - \frac{V_{th}}{V_P}\right) \tag{2}$$

The potential at the capacitor C drops to zero immediately after the transistor $Tr_3$ or $Tr_4$ is turned OFF. In the illustrated example, the timer 28 of FIG. 7 is made up by a CR integration circuit. Whenever the level of the signal under transmission changes, the signal TXSENSE never fails to fall to zero for the time T. This results in initializing the timer to zero and re-starting time measurement. As already described, if the signal TXSENSE lasts for more than the reference time, the signal TIMEOUT is developed to force the transmission state to a halt.

Figure 10:
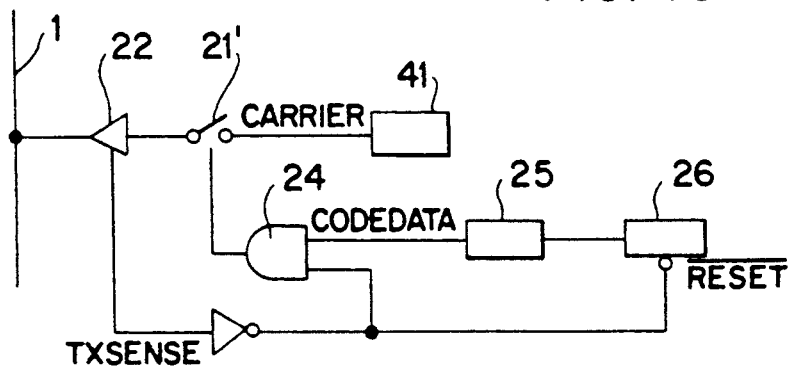
FIG. 10 is a block diagram of another embodiment of the present invention.
Figure 11:
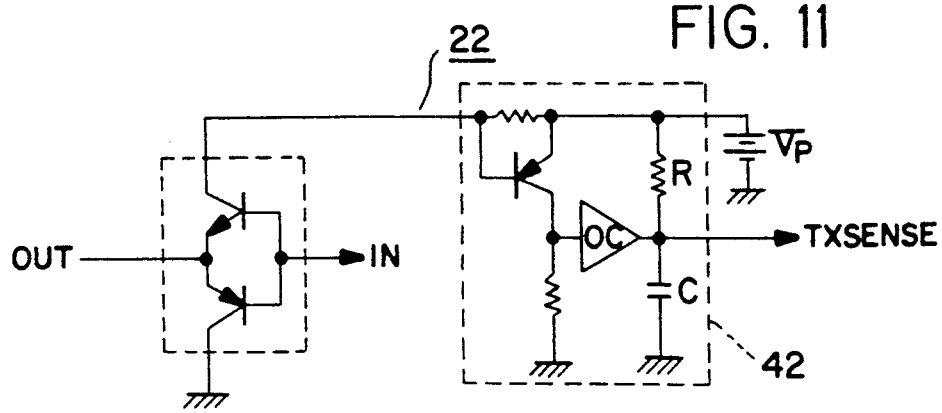
FIG. 11 is a block diagram showing details of a major portion of FIG. 10.

It is obvious that the present invention is equally applicable to transmission systems that use a carrier. Another embodiment of the present invention using AM modulation is shown in FIG. 10, with a simpler circuit than the previous embodiment of FIG. 7. The components 1, 22, 24-26 are similar to those in FIG. 7. A transmission/disconnection switch 21' also serves to determine whether to apply the carrier. A carrier oscillator is denoted by 41. FIG. 11 shows a circuit corresponding to that in FIG. 8, wherein a CR integration circuit 42 is equivalent to the timer 28 of FIG. 7. The CR time constant of the integration circuit 42 is selected within a range from T to 2τ. The circuit 33 in FIG. 8 is not necessary because of the need for only decision as to whether to apply the carrier.

The invention thus being described, it will be obvious that the same may be varied in many ways. Such variations are not to be regarded as a departure from the spirit and scope of the invention, and all such modifications are intended to be included within the scope of the following claims.

What is claimed is:

1. A data transmission module connected to a transmission cable comprising:
   generating means for generating codes which do not last at a same level for more than a given time even when same data are transmitted continuously;
   monitoring means, operatively connected to said generating means, for monitoring said codes generated by said generating means and for determining an amount of time that said codes last at the same level;
   detector means, operatively connected to said monitoring means, for generating a fault signal if the amount of time said codes stay at the same level as monitored by said monitoring means exceeds a predetermined time; and
   switching means, operatively connected to said detector means, for disconnecting the data transmission module from the transmission cable in response to said fault signal.

2. The data transmission module as claimed in claim 1, wherein a logic "1" is defined by binary levels "1" and "0" in time sequence and a logic "0" by binary levels "0" and "1" in time sequence.

3. The data transmission module as claimed in claim 1, wherein said codes are in Manchester notation.

4. The data transmission system as set forth in claim 1, wherein said predetermined time is selected to be a greater period of time than a period of time needed to generate a logic "1" or logic "0".

5. The data transmission module as claimed in claim 1, wherein logic "1" and logic "0" are represented by Non Return to Zero code notation and converted into Manchester Code.

6. A data transmission module connected to a transmission cable comprising:
   generating means for generating codes, said codes representing data to be transmitted;
   fault detecting means, operatively connected to said generating means, for generating a fault signal when said codes generated by said generating means are faulty; and
   switching means, operatively connected to said fault detecting means, for disconnecting the data transmission module from the transmission cable in response to said fault signal.

7. The data transmission module as claimed in claim 6, wherein said fault detecting means generates said fault signal when an amount of time said codes stay at a same level exceeds a predetermined amount of time.

8. The data transmission module as claimed in claim 7, wherein said predetermined amount of time is a greater period of time needed to generate a single bit of data.

9. A method for removing a data transmission module from a data transmission system without disrupting the operations of the data transmission system which includes a plurality of data transmission modules connected to a cable in a multidrop manner when faulty data is being transmitted, comprising the steps of:
   (a) monitoring codes generated by a data transmission module before the codes are transmitted onto the cable, the monitoring is carried out by the data transmission module generating the codes;
   (b) determining when the codes being monitored in said step (a) represent a fault condition; and
   (c) disconnecting the data transmission module monitoring the codes in said step (a) from the cable when a fault condition has been determined in said step (b).

10. The method as claimed in claim 9 further comprising the step of:
    (d) generating codes for data transmission onto the cable wherein the codes are in Manchester notation.

11. The method as claimed in claim 9 further comprising the step of:
    (d) generating codes for data transmission wherein a logic "1" is defined by a binary "1" and a binary "0" in time sequence and a logic "0" by a binary "0" and a binary "1" in time sequence.

12. A data transmission system comprising:
    a single transmission cable; and
    a plurality of data transmission modules connected to said single transmission cable in a multidrop manner;
    each data transmission module including,
       generating means for generating codes, said codes representing data to be transmitted,
       fault detecting means, operatively connected to said generating means, for generating a fault signal when said codes generated by said generating means are faulty, and
       switching means, operatively connected to said fault detecting means, for disconnecting said data transmission module from said single transmission cable in response to said fault signal;
    said switching means disconnecting said data transmission module such that the data transmission system can continue to operate properly with the remaining data transmission modules.

13. The data transmission module as claimed in claim 12, wherein said fault detecting means generates said fault signal when an amount of time said codes stay at a same level exceeds a predetermined amount of time.

14. The data transmission module as claimed in claim 13, wherein said predetermined amount of time is a greater period of time needed to generate a single bit of data.

* * * * *

UNITED STATES PATENT AND TRADEMARK OFFICE
CERTIFICATE OF CORRECTION

PATENT NO. : 5,266,943
DATED : November 30, 1993
INVENTOR(S) : Masahiro ISE et al It is certified that error appears in the above-indentified patent and that said Letters Patent is hereby corrected as shown below:

On the Title Page, Item [75]:

Please change "Machimno" to --Machino--.

Signed and Sealed this

Twenty-first Day of June, 1994

*Attest:*

BRUCE LEHMAN

*Attesting Officer*     *Commissioner of Patents and Trademarks*